(12) United States Patent
Sugaya

(10) Patent No.: US 6,466,587 B1
(45) Date of Patent: Oct. 15, 2002

(54) WIRELESS TRANSMITTING METHOD

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/252,779

(22) Filed: Feb. 19, 1999

(30) Foreign Application Priority Data

Feb. 23, 1998 (JP) .......................................... 10-040319

(51) Int. Cl.[7] .............................................. H04J 15/00
(52) U.S. Cl. ...................................... 370/468; 370/347
(58) Field of Search ................................ 370/468, 465, 370/466, 443, 461, 395, 280, 252, 254, 294, 389, 503, 509, 442, 347, 337, 336, 338, 321, 345, 349, 401; 709/237, 222, 228, 232, 243; 348/384.1, 387.1

(56) References Cited

U.S. PATENT DOCUMENTS

| 5,392,280 A | 2/1995 | Zheng |
| 5,570,355 A | 10/1996 | Dail et al. |
| 5,684,791 A | 11/1997 | Raychaudhuri et al. ..... 370/278 |
| 5,953,344 A | * 9/1999 | Dail et al. ................... 370/443 |
| 6,058,106 A | * 5/2000 | Cudak et al. ................ 370/313 |
| 6,088,337 A | * 7/2000 | Eastmond et al. .......... 370/280 |

FOREIGN PATENT DOCUMENTS

| EP | 0932277 | 7/1999 | ........... H01L/12/28 |
| EP | 0948166 | 10/1999 | ........... H04L/12/28 |
| WO | 9747112 | 12/1997 | ........... H01L/12/28 |

* cited by examiner

Primary Examiner—Dang Ton
(74) Attorney, Agent, or Firm—Jay H. Maioli

(57) ABSTRACT

A wireless transmitting method, for use with digital electronic unit including the steps of forming a frame having a predetermined time period, placing a stream transmission area SPA and an asynchronous transmission area ASYNCA in the frame, the stream transmission area SPA having a predetermined number of time slots SL1, SL2, . . . for transmitting data, allocating isochronous data to the time slots, transmitting the isochronous data in the stream transmission area SPA, transmitting asynchronous data in the asynchronous transmission area ASYNCA, and changing the allocation of the time slots and widening the asynchronous transmission area ASYNCA of the frame so as to gather the asynchronous transmission area ASYNCA when a time slot is unallocated.

5 Claims, 12 Drawing Sheets

Fig. 8A
Fig. 8B
Fig. 8C
Fig. 8D

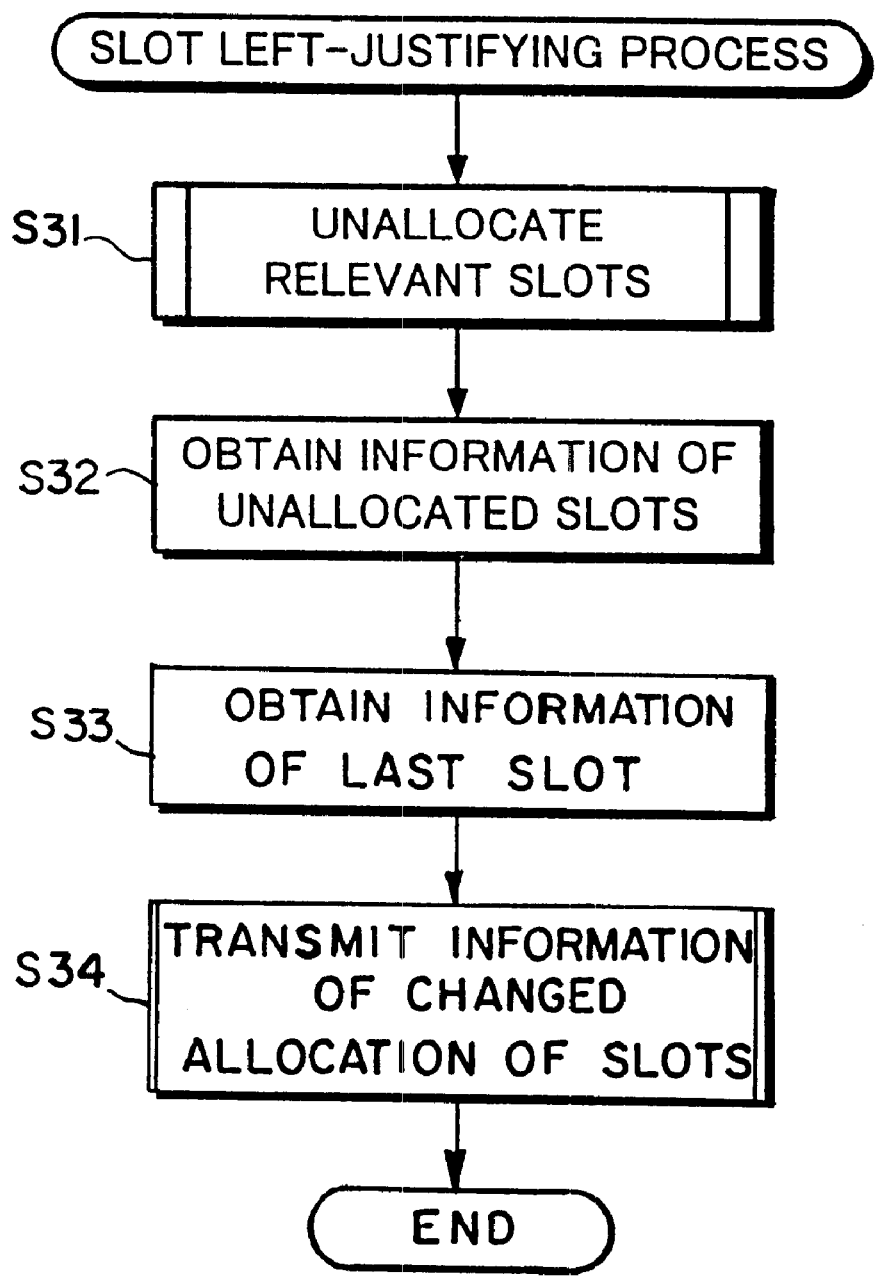

WIRELESS TRANSMITTING METHOD

BACKGROUND OF THE INVENTION

1. Field of the Invention

The present invention relates to a wireless transmitting method suitable for wirelessly transmitting chronologically continuous data streams (such as digital audio data and digital video data) and asynchronous data (such as commands) between for example digital audio units or between digital video units.

2. Description of the Related Art

Audio units and video units have been digitized as with for example CD (Compact Disc) players, MD (Mini Disc) recorders/players, digital VCRs, digital cameras, and DVD (Digital Versatile Disc) players. As personal computers have become common, systems that connect such digital audio units or digital video units to personal computers have been proposed. As an interface that accomplishes a system that connects such digital audio units or such digital video units to a personal computer, the IEEE 1394 interface is becoming the preferred interface.

The IEEE 1394 interface supports both an isochronous transmission mode and an asynchronous transmission mode. The isochronous transmission mode is suitable for transmitting chronologically continuous data streams such as video data and audio data at high speed. The asynchronous transmission mode is suitable for transmitting various commands and files. Since the IEEE 1394 interface supports both the isochronous transmission mode and the asynchronous transmission mode, when the IEEE 1394 interface is used, video data and audio data can be transmitted between digital audio units and between digital video units, respectively. With a personal computer connected to such digital units through the IEEE 1394 interface, the user can easily control and edit video data and audio data.

The IEEE 1394 interface is a wired interface. To structure such a system with a wired interface, cable connections are required. In addition, such cable connections tend to become complicated. Moreover, with a wired interface, it is difficult to connect units that are disposed in different rooms.

Thus, it is desired to accomplish a wireless interface that wirelessly connects digital audio units or digital video units and connects these units and a personal computer. When digital audio units or digital video units are wirelessly connected or when these units and a personal computer are wirelessly connected, as with the above-described the IEEE 1394 interface, it is desired to support both the isochronous transmission mode that allows a data stream such as video data or audio data to be transmitted at high speed and the asynchronous transmission mode that allows asynchronous data such as commands and files to be transmitted in the same manner as the IEEE 1394 interface.

However, a transmission path available with a wireless LAN is restricted. Thus, it is difficult to effectively transmit two different types of data transmission such as a data stream at high speed and asynchronous data on a wireless transmission path.

OBJECTS AND SUMMARY OF THE INVENTION

Therefore, an object of the present invention is to provide a wireless transmitting method that allows two different types of data transmission such as data streams and asynchronous data to be effectively transmitted so as to effectively transmit data between digital audio units, between digital video units, or between these units and a personal computer.

To solve the above-described problem, the present invention is a wireless transmitting method, comprising the steps of forming a frame having a predetermined time period, placing a stream transmission period and an asynchronous transmission period in the frame, the stream transmission period having a predetermined number of time slots for transmitting data, allocating isochronous data to the time slots, transmitting the isochronous data in the stream transmission period, and transmitting asynchronous data in the asynchronous transmission period.

In addition, the present invention is a wireless transmitting method, comprising the steps of forming a frame having a predetermined time period, placing a stream transmission period and an asynchronous transmission period in the frame, the stream transmission period having a predetermined number of time slots for transmitting data, allocating isochronous data to the time slots, transmitting the isochronous data in the stream transmission period, transmitting asynchronous data in the asynchronous transmission period, and changing the allocation of the time slots and widening the asynchronous transmission period of the frame so as to gather the asynchronous transmission period when a time slot is unallocated.

Moreover, the present invention is a wireless transmitting method, comprising the steps of forming a frame having a predetermined time period, placing a stream transmission period and an asynchronous transmission period in the frame, the stream transmission period having a predetermined number of time slots for transmitting data, allocating isochronous data to the time slots, transmitting the isochronous data in the stream transmission period, transmitting asynchronous data in the asynchronous transmission period, searching a data stream having time slots that are unallocated, and placing the time slots of the searched data stream to the positions of the unallocated time slots so as to gather and widen the asynchronous transmission period.

The present invention is a wireless transmitting method, comprising the steps of forming a frame having a predetermined time period, placing a stream transmission period and an asynchronous transmission period in the frame, the stream transmission period having a predetermined number of time slots for transmitting data, allocating isochronous data to the time slots, transmitting the isochronous data in the stream transmission period, and transmitting asynchronous data in the asynchronous transmission period. Thus, two different types of data transmission of data streams and asynchronous data can be effectively performed.

The present invention is a wireless transmitting method, comprising the steps of forming a frame having a predetermined time period, placing a stream transmission period and an asynchronous transmission period in the frame, the stream transmission period having a predetermined number of time slots for transmitting data, allocating isochronous data to the time slots, transmitting the isochronous data in the stream transmission period, transmitting asynchronous data in the asynchronous transmission period, and changing the allocation of the time slots and widening the asynchronous transmission period of the frame so as to gather the asynchronous transmission period when a time slot is unallocated. Thus, two different types of data transmission of data streams and asynchronous data can be effectively performed.

The wireless transmitting method further comprising the steps of searching a data stream having time slots that are unallocated, and placing the time slots of the searched data stream to the positions of the unallocated time slots so as to gather and widen the asynchronous transmission period. Thus, two different types of data transmission of data streams and asynchronous data can be effectively performed. In addition, the continuity of time slots used for a data stream can be maintained.

The above, and other, objects, features and advantage of the present invention will become readily apparent from the following detailed description thereof which is to be read in connection with the accompanying drawings.

BRIEF DESCRIPTION OF THE DRAWINGS

FIGS. 8A to 8D are schematic diagrams for explaining an example of a slot position changing process;

FIG. 9 is a flow chart for explaining an example of a slot position changing process;

DETAILED DESCRIPTION OF THE PREFERRED EMBODIMENTS

Figure 1:
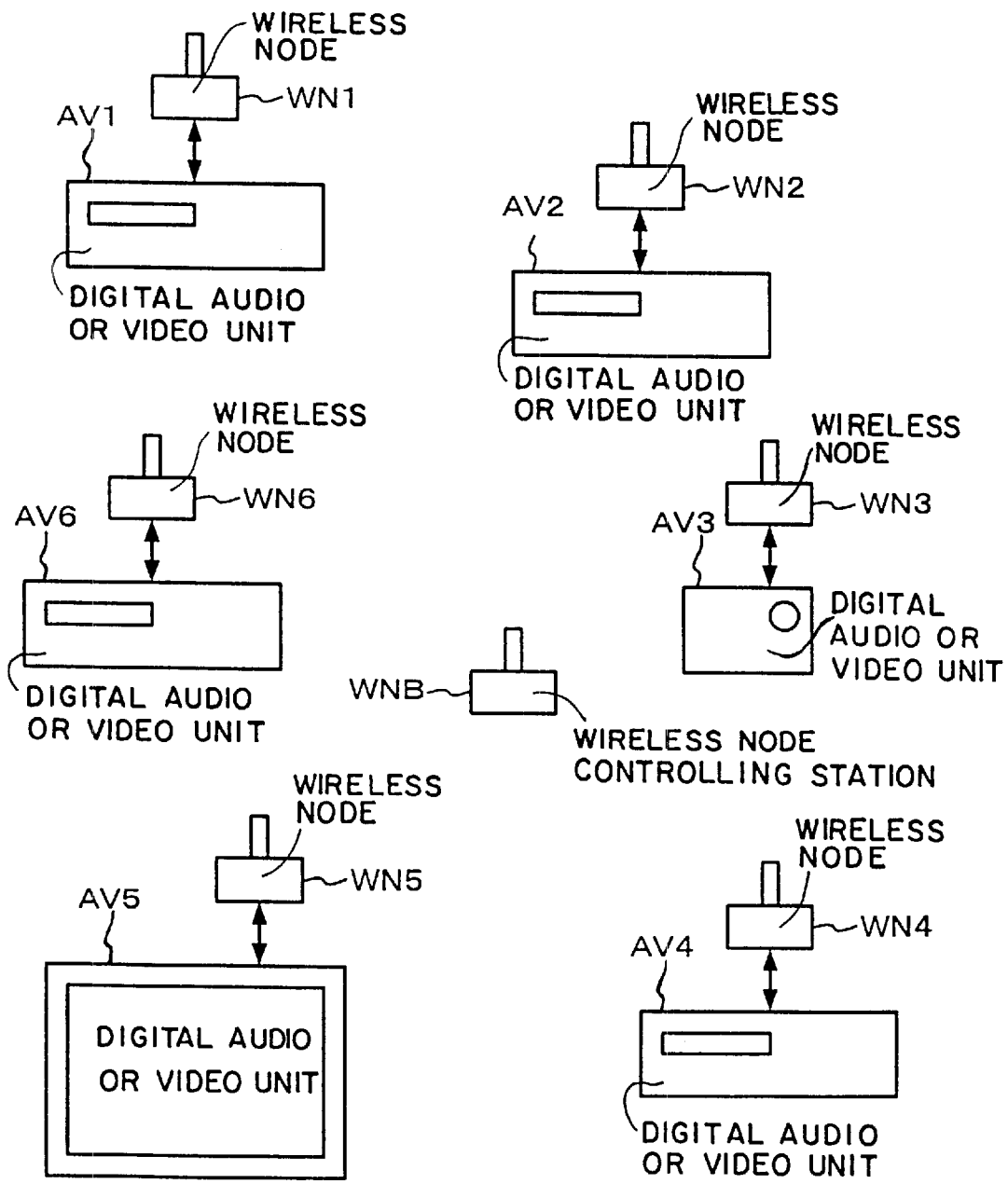
FIG. 1 is a schematic diagram showing an example of a wireless network system according to the present invention.

Next, with reference to the accompanying drawings, an embodiment of the present invention will be described. According to the present invention, as with the IEEE 1394 interface, a system that wirelessly transmits a data stream (such as video data or audio data) and asynchronous data (such as commands) is structured. FIG. 1 shows an outline of such a wireless network system.

In FIG. 1, WN1, WN2, WN3, . . . are wireless nodes as Peripheral communicating stations. Digital audio units or digital video units AV1, AV2, . . . , such as a CD player, an MD recorder/player, a digital VCR, a digital camera, a DVD player, and a television receiver can be connected to the wireless nodes WN1, WN2, . . . . In addition, a personal computer can be connected to the wireless nodes WN1, WN2, WN3, . . . . Each of the digital audio units and digital video units AV1, AV2, . . . connected to the wireless nodes WN1, WN2, . . . has the IEEE 1394 digital interface. The wireless nodes WN1, WN2, . . . and the digital audio units and digital video units AV1, AV2, . . . are connected with the IEEE 1394 digital interface.

WNB is a wireless node as a controlling station. The wireless node WNB as the controlling station exchanges control data with the wireless nodes WN1, WN2, . . . as the communicating stations. The wireless nodes WN1, WN2, . . . as the communicating stations communicate each other under the control of the wireless node WNB as the controlling station. The wireless nodes WN1, WN2, . . . as the communicating stations wirelessly exchange chronologically continuous data streams (isochronous data) and asynchronous data such as commands.

Figure 2:
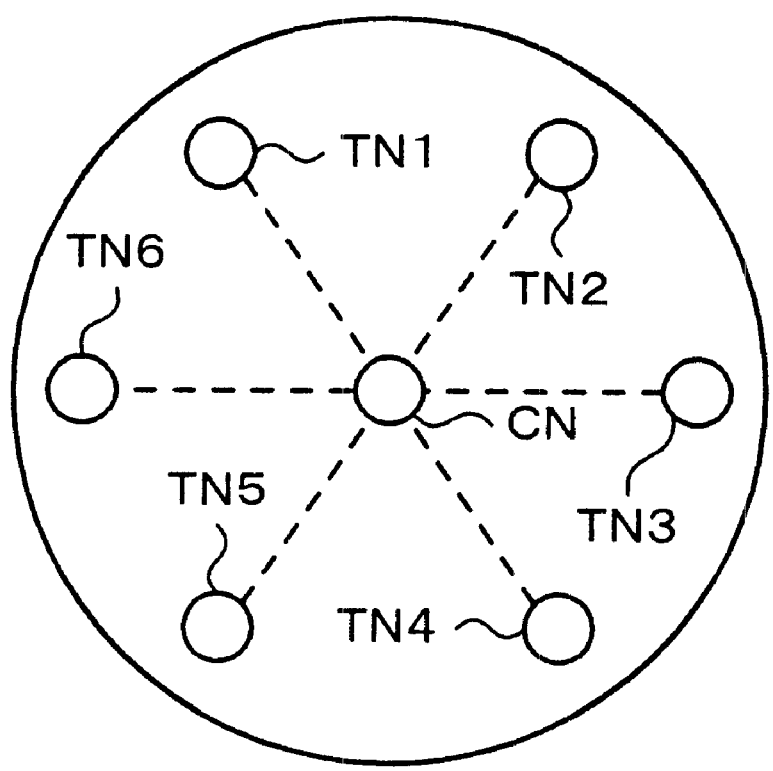
FIG. 2 is a schematic diagram for explaining a star type network system.

In this example, as shown in FIG. 2, a star type topology wireless LAN is structured. In the star type topology, the wireless LAN is composed of a central controlling station CN and peripheral terminal stations TN1, TN2, . . . . The terminal stations TN1, TN2, . . . exchange data under the control of the central controlling station CN. The central controlling station CN corresponds to the wireless node WNB. The terminal stations TN1, TN2, . . . correspond to the wireless nodes WN1, WN2, . . . . It should be noted that the structure of the wireless LAN is not limited to such a star type topology.

Control data, chronologically continuous data streams such as audio data and video data, and asynchronous data such as commands are transmitted between the wireless nodes WN1, WN2, . . . and the wireless node WNB. These types of data are transmitted as frames as shown in FIG. 3.

Figure 3:
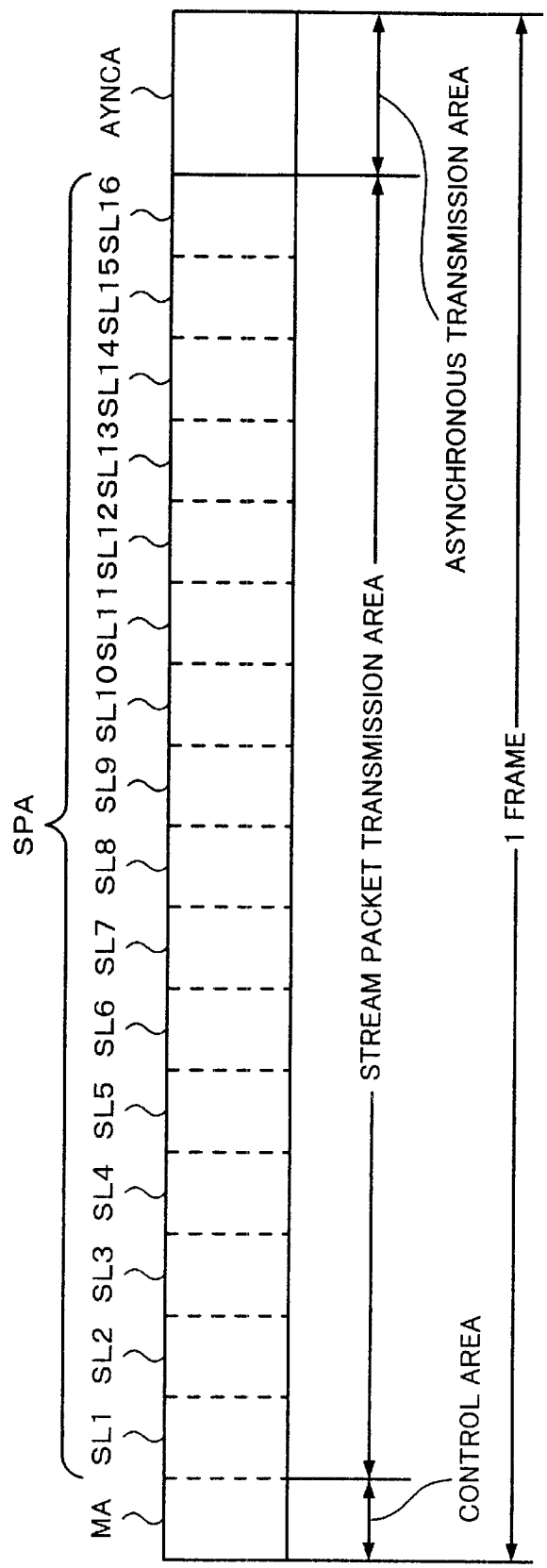
FIG. 3 is a schematic diagram for explaining the structure of one frame in the wireless network system according to the present invention.

FIG. 3 shows a frame structure of data transmitted between the wireless node WN1, WN2, . . . and the wireless node WNB. As shown in FIG. 3, at the beginning of one frame, a control area MA for management information such as network information is placed. The control area MA is followed by a stream packet transmission area SPA and an asynchronous transmission area ASYNCA.

The stream packet transmission area SPA is used for a high speed communication equivalent to the isochronous transmission mode of the IEEE 1394 interface. The stream packet transmission area SPA is composed of time slots SL1, SL2, . . . . The time slots SL1, SL2, . . . are units of which data is time-division multiplexed. The time slots are placed at intervals of a predetermined time period. In this example, the number of the time slots SL1, SL2, . . . is 16. With different time slots SL1, SL2, . . . , for example 16 data streams can be transmitted in the same system at a time.

In the above-described example, the number of time slots is 16. However, it should be noted that the number of time slots is not limited to 16. In addition, the time slots may be placed at any positions of a frame.

In the stream packet transmission area SPA, data streams are transmitted with the time slots SL1, SL2, . . . . At this point, the number of time slots SL1, SL2, . . . used for one data stream is not constant. For example, the bit rate of an MPEG2 data stream varies corresponding to its pattern or its motion. When the information amount of a data stream is large, the number of time slots SL1, SL2, . . . used for one data stream becomes large. In contrast, when the information amount of a data stream is small, the number of time slots SL1, SL2, . . . used for one data stream becomes small.

In the stream packet transmission area SPA, since data is transmitted at high speed, a data re-transmitting operation cannot be performed. Thus, an error correction code corresponding to block encoding method is added to the data to correct an error thereof.

The asynchronous transmission area ASYNCA is equivalent to the asynchronous transmission mode of the IEEE 1394 interface. Thus, the asynchronous transmission area ASYNCA is used for asynchronous data such as commands. When data in the asynchronous transmission area ASYNCA is transmitted, for an error-free transmission, an acknowledgment signal sent back from the remote party is checked.

When an acknowledgment signal is not received, a data re-transmitting operation is performed.

As a transmission controlling method in the asynchronous transmission area ASYNCA, the wireless node WNB as the central controlling station polls the wireless nodes WN1, WN2, . . . as the communicating stations or detects carrier signals therefrom so as to prevent transmission requests from colliding on a transmission path.

When data streams are transmitted between the wireless nodes WN1, WN2, . . . , the time slots SL1, SL2, . . . are allocated by the wireless node WNB as the controlling station.

The wireless node WNB as the controlling station manages a communication state of the system and recognizes time slots that are being used. In addition, the wireless node WNB as the controlling station transmits management area information. With the management area information, each of the wireless node WN1, WN2, . . . can determine what time slots SL1, SL2, . . . are being used for what data streams.

When the wireless node WN1, WN2, . . . have issued data stream transmission requests, they are transmitted to the wireless node WNB as the controlling station. The wireless node WNB as the controlling station allocates the time slots SL1, SL2, . . . to the wireless nodes WN1, WN2, . . . that have issued the data transmission requests. In addition, the wireless node WNB as the controlling station transmits information of the newly allocated time slots SL1, SL2, . . . to the other wireless nodes WN1, WN2, . . . . The wireless nodes WN1, WN2, . . . that have been requested for the data transmission transmit data streams to the remote stations with the allocated time slots SL1, SL2, . . . .

Figure 4:
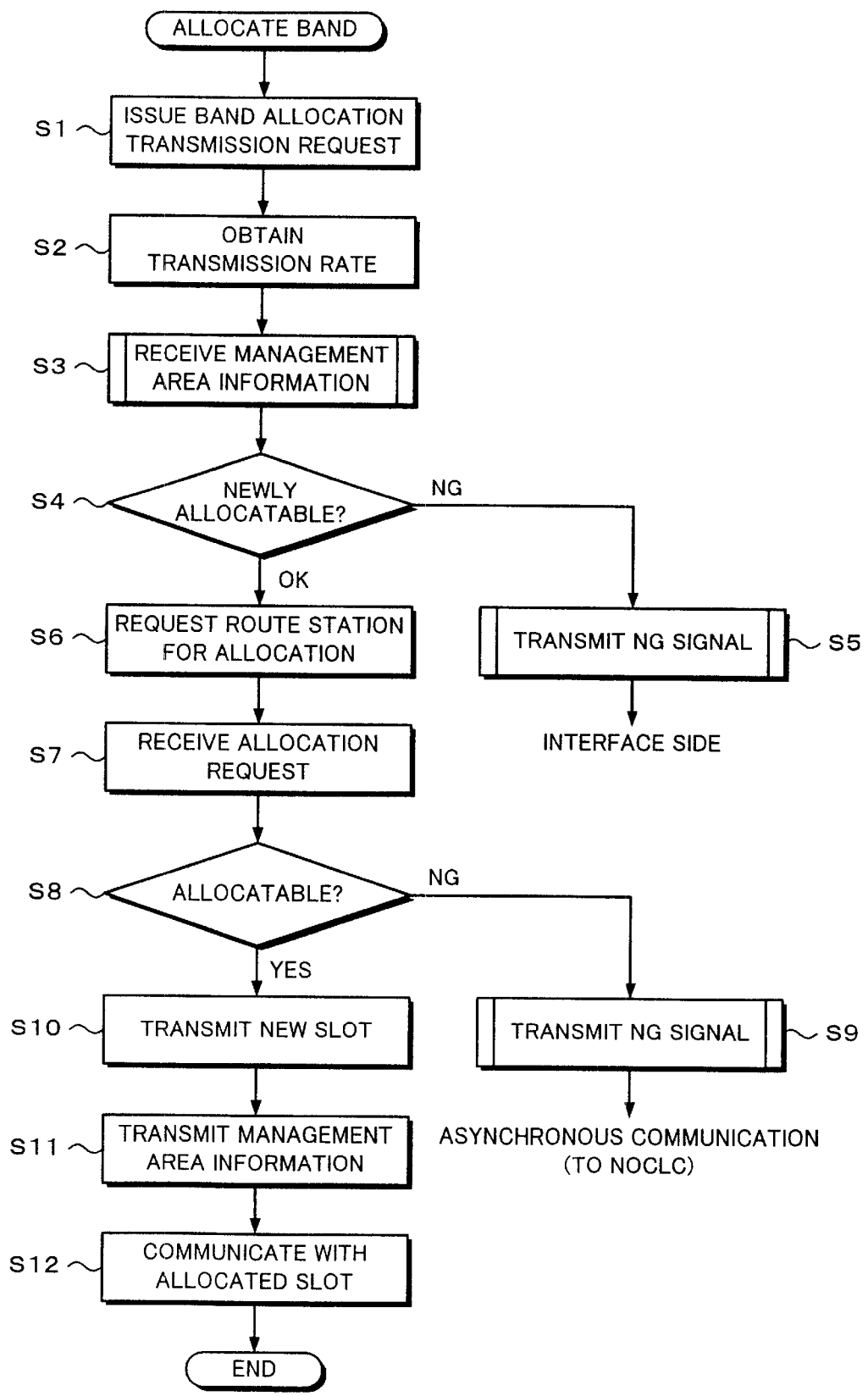
FIG. 4 is a flow chart for explaining a time slot allocating process.

FIG. 4 is a flow chart showing such a process. In FIG. 4, when a unit AV1, AV2, . . . connected to a wireless node WN1, WN2, . . . has issued a transmission request to the wireless node WNB through the interface (at step S1), the wireless node WNB obtains the transmission rate of the data stream (at step S2). The wireless node WN1, WN2, . . . receives management area information (at step S3). The wireless node WN1, WN2, . . . determines whether or not there is a time slot SL1, SL2, . . . that the wireless node WN1, WN2, . . . can newly allocate corresponding to the transmission rate of the data stream (at step S4). When there is no time slot SL1, SL2, . . . that the wireless node WN1, WN2, . . . can allocate, the wireless node WN1, WN2, . . . transmits to the unit AV1, AV2, . . . connected thereto a message that represents the data stream cannot be transmitted (at step S5). When there is a time slot SL1, SL2, . . . that the wireless node WN1, WN2, . . . can allocate, the requested wireless node WN1, WN2, . . . transmits a time slot allocation request to the wireless node WNB as the controlling station (at step S6).

The wireless node WNB as the controlling station receives the time slot allocation request (at step S7) and determines whether or not a time slot can be allocated corresponding to the time slot allocation request (at step S8). When a time slot SL1, SL2, . . . cannot be allocated, the wireless node WNB transmits to the wireless node WN1, WN2, . . . a message that represents that the data stream cannot be transmitted (at step S9). When a time slot SL1, SL2, . . . can be newly allocated, the wireless node WNB transmits the newly allocated time slot SL1, SL2, . . . to both the wireless node WN1, WN2, . . . that has issued the transmission request and the requested wireless node WN1, WN2, . . . (at step S10). The wireless node WNB as the controlling station adds the newly allocated time slot SL1, SL2, . . . to management area information and transmits the resultant management area information to each wireless node WN1, WN2, . . . (at step S11). After the time slot SL1, SL2, . . . has been allocated, the requested wireless node WN1, WN2, . . . transmits and receives data with the allocated time slot (at step S12).

The wireless node WNB as the control station controls the allocation of the time slots SL1, SL2, . . . . The time slot allocation through communication between the wireless node WN1, WN2, . . . and the wireless node WNB may be performed with for example asynchronous data in the asynchronous transmission area ASYNCA. Alternatively, the time slot allocation may be performed with control information in the control area MA at the beginning of each frame.

Figure 5:
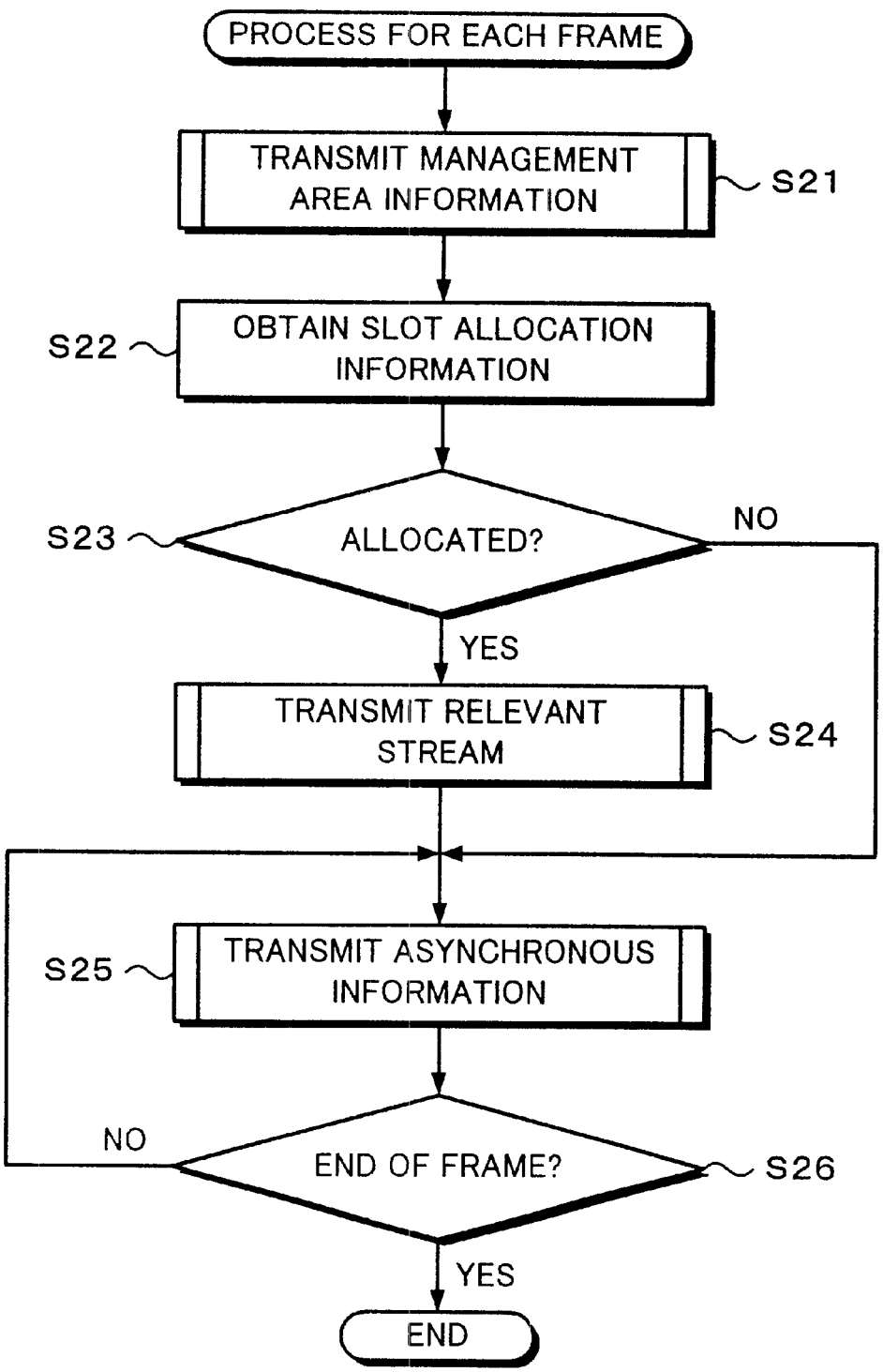
FIG. 5 is a flow chart for explaining a frame process.

FIG. 5 shows a process for forming a frame with the stream packet transmission area SPA and the asynchronous transmission area ASYNCA. In FIG. 5, the wireless node WNB as the control station transmits management area information (at step S21). A wireless node WN1, WN2, . . . as a communicating station receives the management area information and obtains time slot allocation information (at step S22). The wireless node WN1, WN2, . . . as the communicating station determines whether or not an allocated time slot SL1, SL2, . . . is available (at step S23). When the allocated time slot SL1, SL2, . . . is available, the wireless node WN1, WN2, . . . transmits a relevant data stream with the allocated time slot SL1, SL2, . . . (at step S24). When the allocated time slot SL1, SL2, is not available, the wireless node WN1, WN2, . . . does not transmit the data stream. After the wireless node WN1, WN2, . . . has transmitted the data stream, it transmits information in the asynchronous transmission area ASYNCA (at step S25). Thereafter, the wireless node WN1, WN2, . . . determines whether or not one frame has been transmitted (at step S26). When one frame has been transmitted, the wireless node WN1, WN2, . . . completes the process.

After a data stream has been transmitted with the time slots SL1, SL2, . . . , the information in the asynchronous transmission area ASYNCA is transmitted. Thus, the asynchronous transmission area ASYNCA is added at the end of the allocated time slots SL1, SL2, . . . .

As shown in FIG. 3, one frame is composed of a control area MA, a stream packet transmission area SPA, and an asynchronous transmission area ASYNCA. As described above, after data streams have been transmitted with the time slots SL1, SL2, information of the asynchronous transmission area ASYNCA is transmitted. When the unallocated time slots SL1, SL2, . . . are the time slots just followed by the asynchronous transmission area ASYNCA, the time period of the unallocated time slots SL1, SL2, . . . is included in the time period of the asynchronous transmission area ASYNCA. Thus, the time period of the stream packet transmission area SPA and the time period of the asynchronous transmission area ASYNCA are adaptively varied corresponding to a communication state. Thus, when data streams are affordably transmitted, the time period of the asynchronous transmission area ASYNCA is increased. Thus, the efficiency of the data transmission is improved.

Figure 6A:
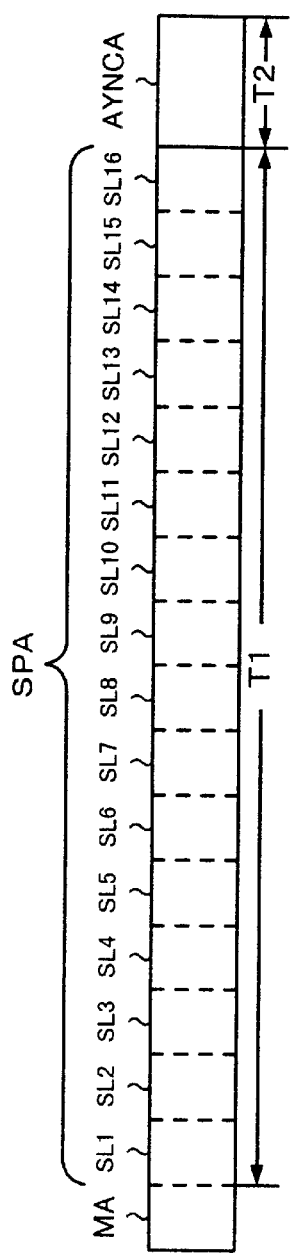
FIGS. 6A to 6C are schematic diagrams for explaining an area allocating process of a frame.

In other words, as shown in FIG. 6A, when all time slots SL1 to SL16 have been used, most of time period T1 of one frame is used for the stream packet transmission area SPA. Time period T2 at the end of one frame is used for the asynchronous transmission area ASYNCA.

Figure 6B:
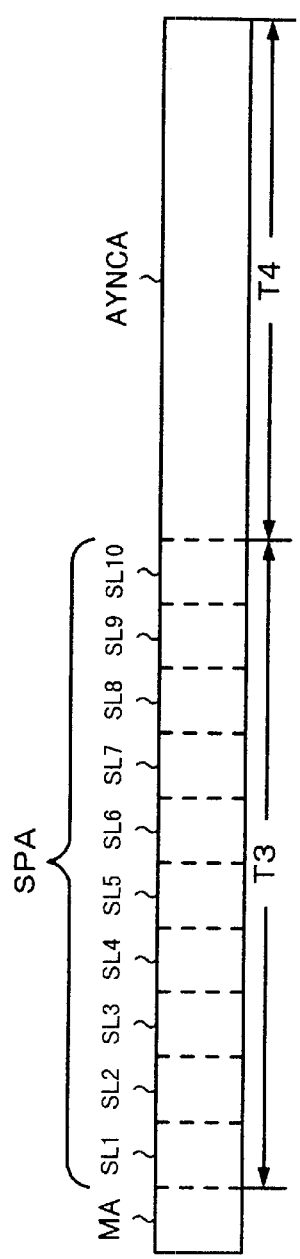

On the other hand, as shown in FIG. 6B, when the time slots SL1 to SL10 have been used and the time slots SL11 to SL16 have not been used, the time period of the stream packet transmission area SPA is narrowed to T3. In contrast, the time period of the asynchronous transmission area ASYNCA is increased to T4.

Figure 6C:
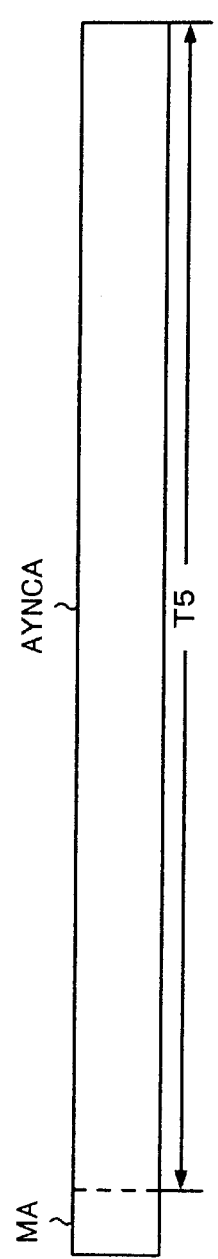

In addition, when the stream packet transmission area SPA has not been used, as shown in FIG. 6C, time period T5 of one frame except for the control area MA is used for the asynchronous transmission area ASYNCA.

Thus, the time period of the stream packet transmission area SPA and the time period of the asynchronous transmission area ASYNCA of one frame are adaptively varied corresponding to a communication state. Consequently, two types of data transmission of data streams and asynchronous data can be effectively performed.

In this system, the transmission data has a frame structure as shown in FIG. 3. Each frame has the stream packet transmission area SPA and the asynchronous transmission area ASYNCA. Chronologically continuous data streams such as audio data and video data are transmitted with time slots SL1, SL2, . . . in the stream packet transmission area SPA. In contrast, the asynchronous data is transmitted in the asynchronous area ASYNCA. Thus, data transmitted through a digital interface having an isochronous transmission mode and an asynchronous transmission mode (as with the IEEE 1394 interface) can be wirelessly transmitted. In addition, corresponding to the uses of the time slots SL1, SL2, . . . , the time period of the stream packet transmission area SPA and the time period of the asynchronous transmission area ASYNCA can be adaptively varied. Consequently, when isochronous data is scarcely transmitted, the wireless transmission path can be allocated to the transmission of the asynchronous data. As a result, data can be effectively transmitted.

When the time period of the stream packet transmission area SPA and the time period of the asynchronous transmission area ASYNCA are adaptively varied corresponding to the uses of the time slots SL1, SL2, . . . , if unallocated time slots SL1, SL2, . . . are the last time slots in the stream packet transmission area SPD, the time period of the asynchronous transmission area ASYNCA can be increased. However, if unallocated time slots SL1, SL2, . . . are the top time slots or intermediate time slots, it is difficult to increase the time period of the asynchronous transmission area ASYNCA.

Figure 7A:
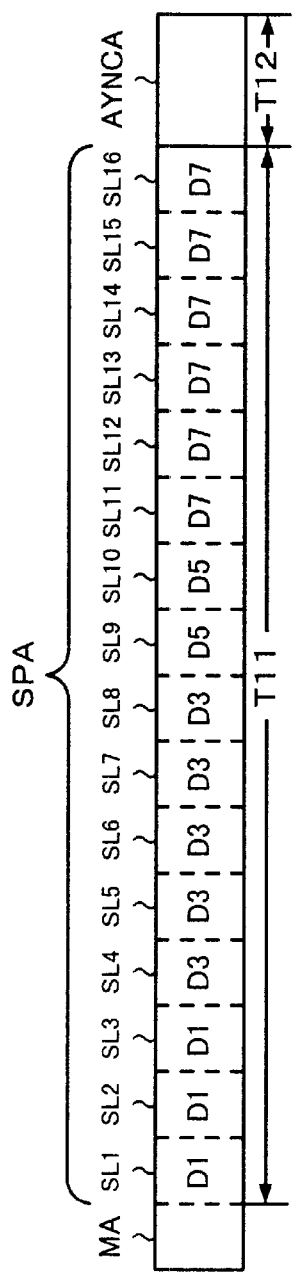
FIGS. 7A to 7C are schematic diagram for explaining an area allocating process of a frame.

In other words, as shown in FIG. 7A, it is assumed that one frame has slots SL1 to SL16, that a data stream D1 is transmitted with the time slots SL1 to SL3, that a data stream D3 is transmitted with the time slots SL4 to SL8, that a data stream D5 is transmitted with the time slots SL9 and SL10, and that a data stream D7 is transmitted with the time slots SL11 to SL16. At this point, since the data streams D1, D3, D5, and D7 are transmitted with all the time slots SL1 to SL16, the time period of the stream packet transmission area SPA is T11. On the other hand, the time period of the asynchronous transmission area ASYNCA is T12.

Figure 7B:
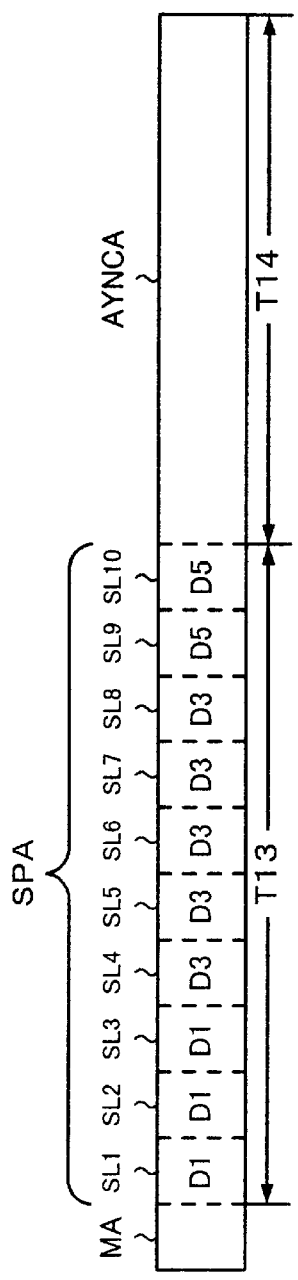

After the data stream D7 has been transmitted, the time slots SL11 to SL16 used for the data stream D7 can be unallocated. When the last time slots SL11 to SL16 followed by the asynchronous transmission area ASYNCA are unallocated, as shown in FIG. 7B, the time period of the time slots SL11 to SL16 can be used for the time period of the asynchronous transmission area ASYNCA. Thus, as shown in FIG. 7B, the time period of the stream packet transmission area SPA is decreased to T13. In contrast, the time period of the asynchronous transmission area ASYNCA is increased to T14.

Figure 7C:
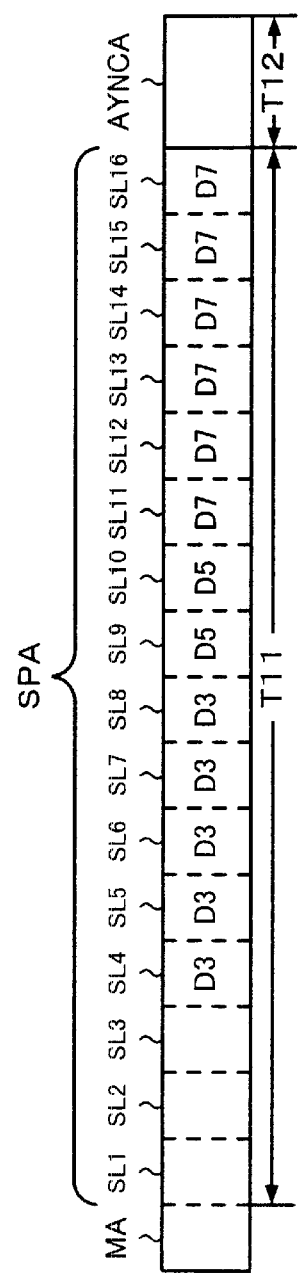

After the data stream D1 has been transmitted, although the time slots SL1 to SL3 for the data stream D1 are unallocated, as shown in FIG. 7C, since the unallocated time slots SL1 to SL3 are not directly followed by the asynchronous transmission area ASYNCA, the time period of the asynchronous transmission area ASYNCA is not increased. In other words, the time period of the stream packet transmission area SPA is still T11. Likewise, the time period of the asynchronous transmission area ASYNCA is still T12.

To solve such a problem, when a time slot is unallocated, a time slot allocation changing process for causing an unallocated time slot to be placed at the end of the stream packet transmission area SPA and thereby the asynchronous transmission area to be widened is performed.

Figures 8A, 8B, 8C, 8D:
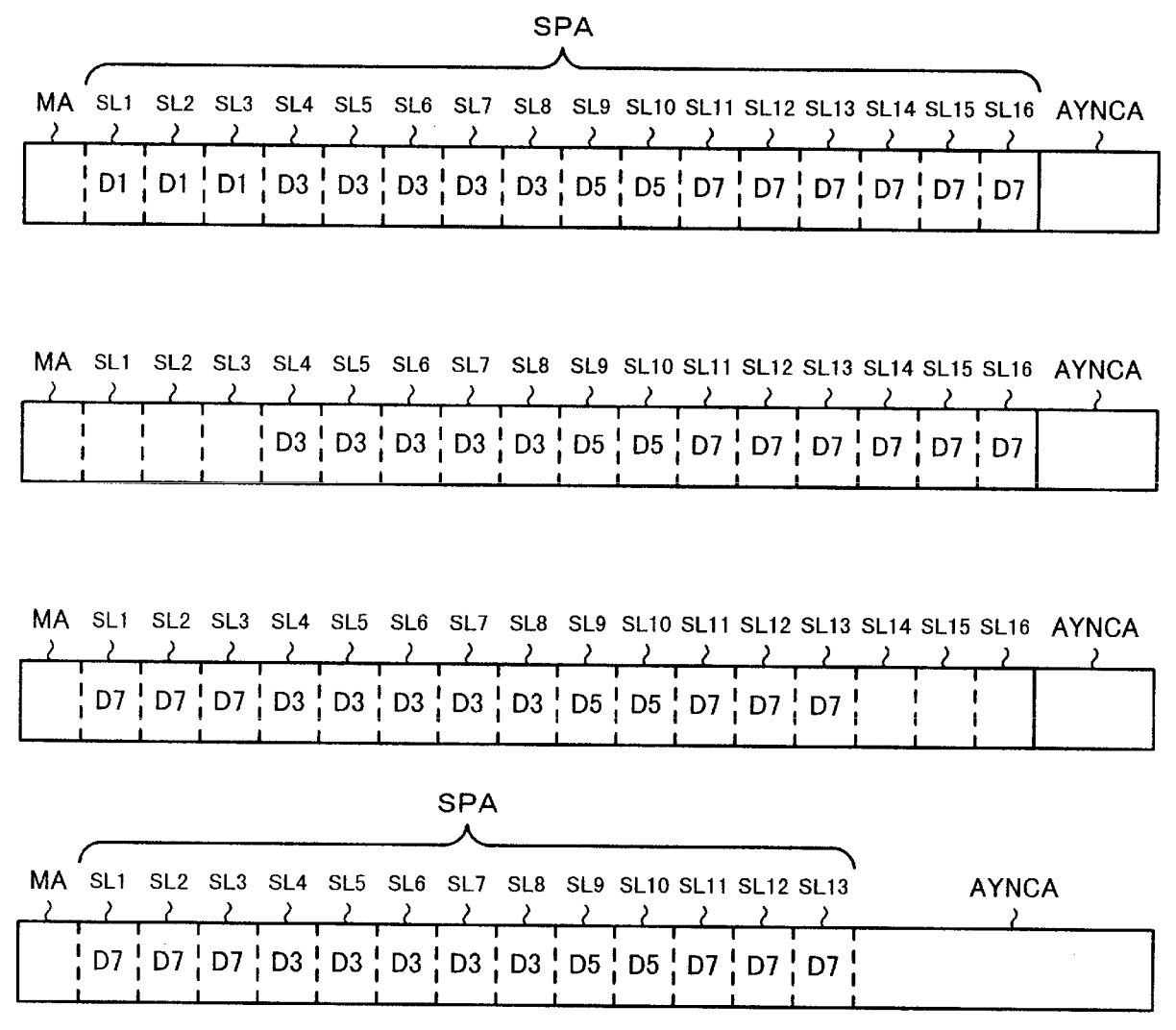

In other words, as shown in FIG. 8A, it is assumed that one frame has time slots SL1 to SL16, that a data stream D1 is transmitted with the time slots SL1 to SL3, that a data stream D3 is transmitted with the time slots SL4 to SL8, that a data stream D5 is transmitted with the time slots SL9 and SL10, and that a data stream D7 is transmitted with the time slots SL11 to SL16.

As shown in FIG. 8B, after the data stream D1 has been transmitted, the time slots SL1 to SL3 for the data stream D1 are unallocated.

In this case, since the three time slots SL1 to SL3 have been unallocated, the last three time slots SL14 to SL16 for the data stream D7 are moved to the positions of the time slots SL1 to SL3. Thus, as shown in FIG. 8C, the last three time slots SL14 to SL16 become blank. As shown in FIG. 8D, the blank area of the three slots SL14 to SL16 is used for the asynchronous transmission area ASYNCA. Thus, the asynchronous transmission area ASYNCA is widened.

FIG. 9 is a flow chart showing the time slot changing process. In FIG. 9, after data streams have been transmitted between the wireless nodes WN1, WN2, . . . and time slots for a data stream have been unallocated (at step S31), information of the unallocated time slots is obtained (at step S32). In addition, information of the last time slot that has been unallocated is obtained (at step S33). The last time slot is changed to the position of the unallocated time slot and the allocation of the changed time slot is transmitted (at step S34).

When a time slot is unallocated, the last time slot is changed to the position of the unallocated time slot. Thus, the last time slot becomes a blank time slot. Consequently, the asynchronous transmission area can be widened.

In the above-described example, the last time slot is changed to the position of an unallocated time slot. However, in this case, data streams do not accord allocated time slot numbers. In other words, in the example shown in FIGS. 8A to 8D, the data stream D7 is divided into a data stream of the time slots SL1 to SL3 and a data stream of the time slots SL11 to SL13. Thus, as shown in FIGS. 10A to 10E, a process for causing data streams to be placed in successive time slots is performed.

Figure 10A:
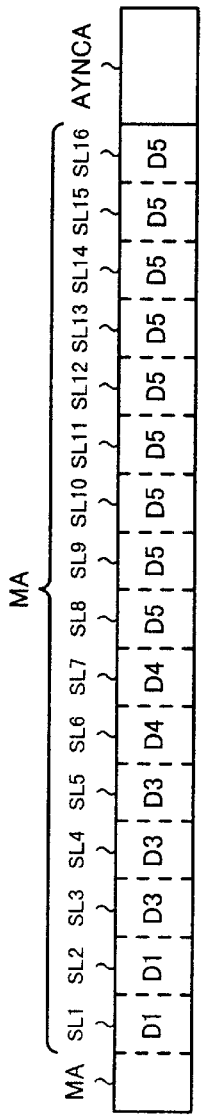
FIGS. 10A to 10E are schematic diagrams for explaining another example of the slot position changing process.

As shown in FIG. 10A, it is assumed that one frame has time slots SL1 to SL16, that a data stream D1 is transmitted with the time slots SL1 and SL2, that a data stream D3 is transmitted with the time slots SL3 to SL5, that a data stream D4 is transmitted with the time slots SL6 and SL7, and that a data stream D5 is transmitted with the time slots SL8 to SL16.

Figure 10B:
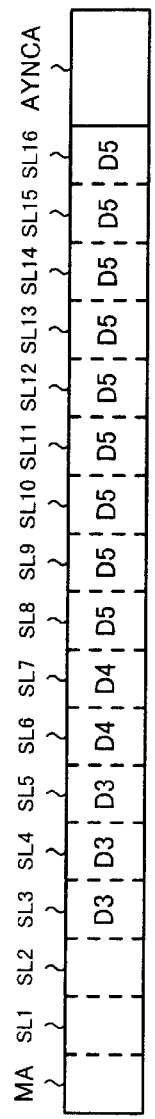

As shown in FIG. 10B, after the data stream D1 has been transmitted, the time slots SL1 and SL2 for the data stream D1 are unallocated.

Figure 10C:
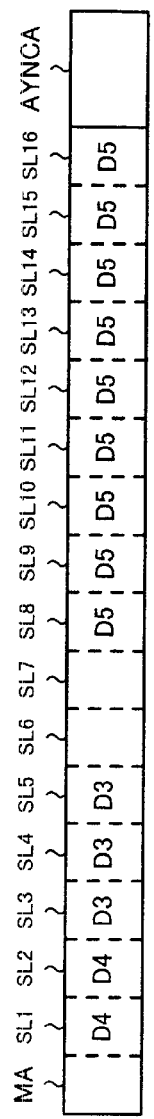

A data stream that uses the same number of time slots as the time slots SL1 and SL2 for the data stream D1 is searched. In this case, since the data stream D4 uses the time slots SL6 and SL7, the data stream D4 is obtained. In this case, as shown in FIG. 10C, the data stream D4 is moved from the positions of the time slots SL6 and SL7 to the positions of the time slots SL1 and SL2.

Figure 10D:
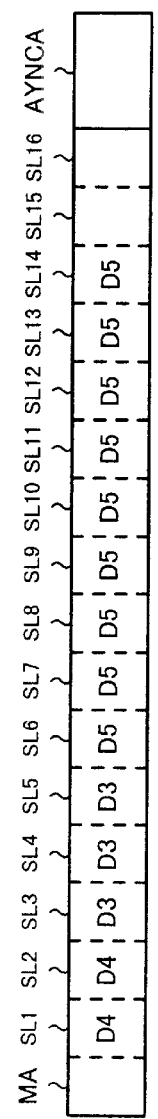

Thereafter, as shown in FIG. 10D, the last two time slots SL15 and SL16 for the data stream D5 are moved to the positions of the time slots SL6 and SL7.

Figure 10E:
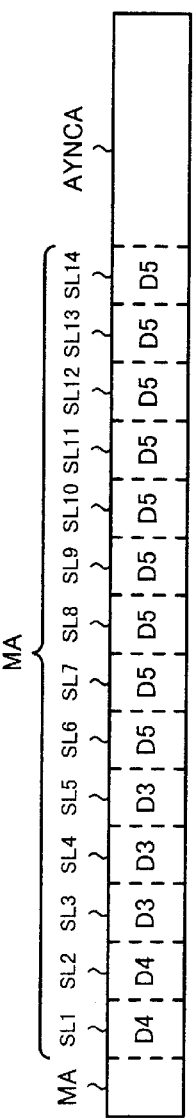

Thus, as shown in FIG. 10D, the last two time slots SL15 and SL16 become blank. As shown in FIG. 10E, the two blank time slots SLI5 and SL16 are used for the asynchronous transmission area ASYNCA. Thus, the asynchronous transmission area ASYNCA is widened.

Figure 11:
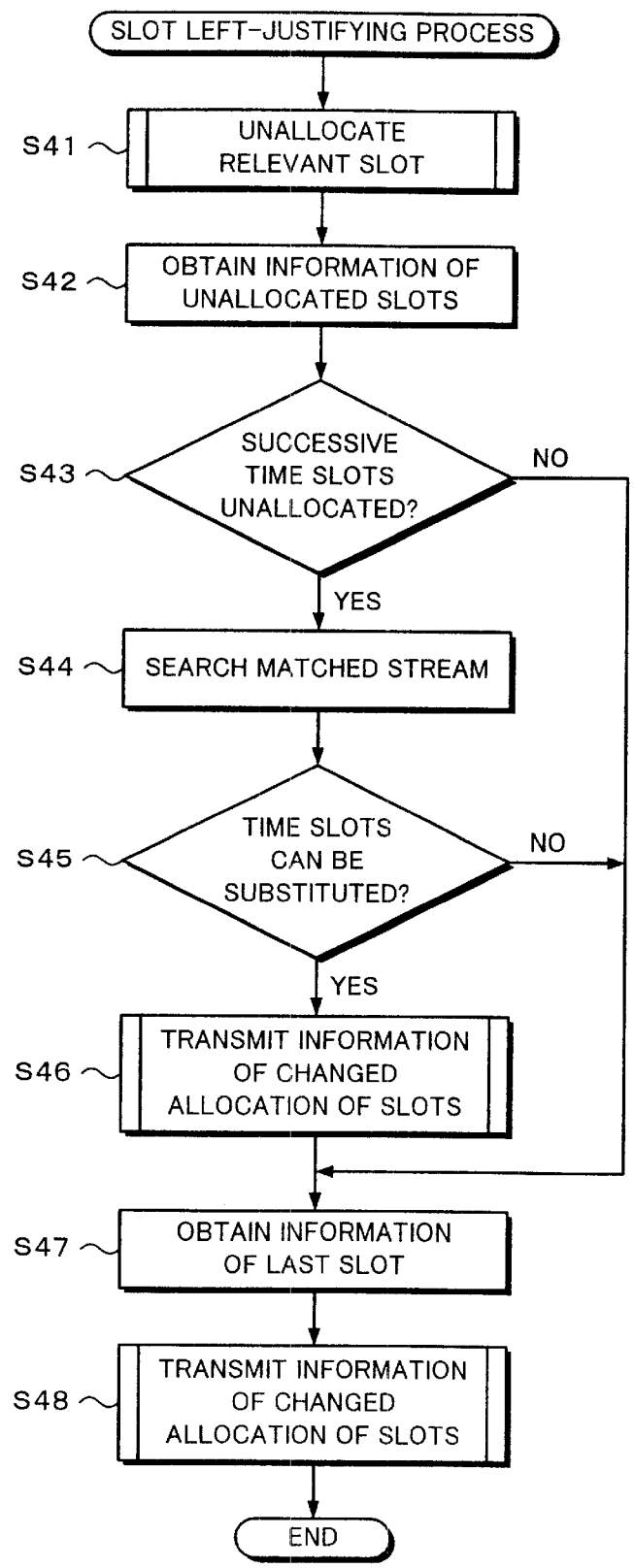
FIG. 11 is a flow chart for explaining another example of the slot position changing process.

FIG. 11 is a flow chart showing the above-described sophisticated time slot position changing process. In FIG. 11, after a data stream has been transmitted between the wireless nodes WN1, WN2, . . . and then time slots for the data stream has been unallocated (at step S41), information of the unallocated time slots is obtained (at step S42). Thereafter, it is determined whether or not successive time slots have been unallocated (at step S43).

When successive time slots have been unallocated, it is determined whether or not there is a data stream using the same number of time slots as the unallocated time slots (at step S44).

When there is a data stream using the same number of time slots as the unallocated time slots, it is determined whether or not the slots for the obtained data stream can be substituted with the unallocated time slots (at step S45). When the slots for the obtained data stream can be substituted with the unallocated time slots, the relevant time slots are substituted and information of the allocation of the changed slots is transmitted (at step S46). Thereafter, information of the last time slot is obtained (at step S47). The last time slot is changed to the position of the blank time slot. Information of the allocation of the changed time slots is transmitted (at step S48).

When there is no data stream using the same number of time slots as the unallocated time slots at step S43 or when the relevant time slots cannot be substituted at step S45, the flow advances to step S47. At step S47, information of the last time slot is obtained. The last time slot is changed to the position of the blank time slot and information of the changed allocation of time slots is transmitted (at step S48).

Figure 12:
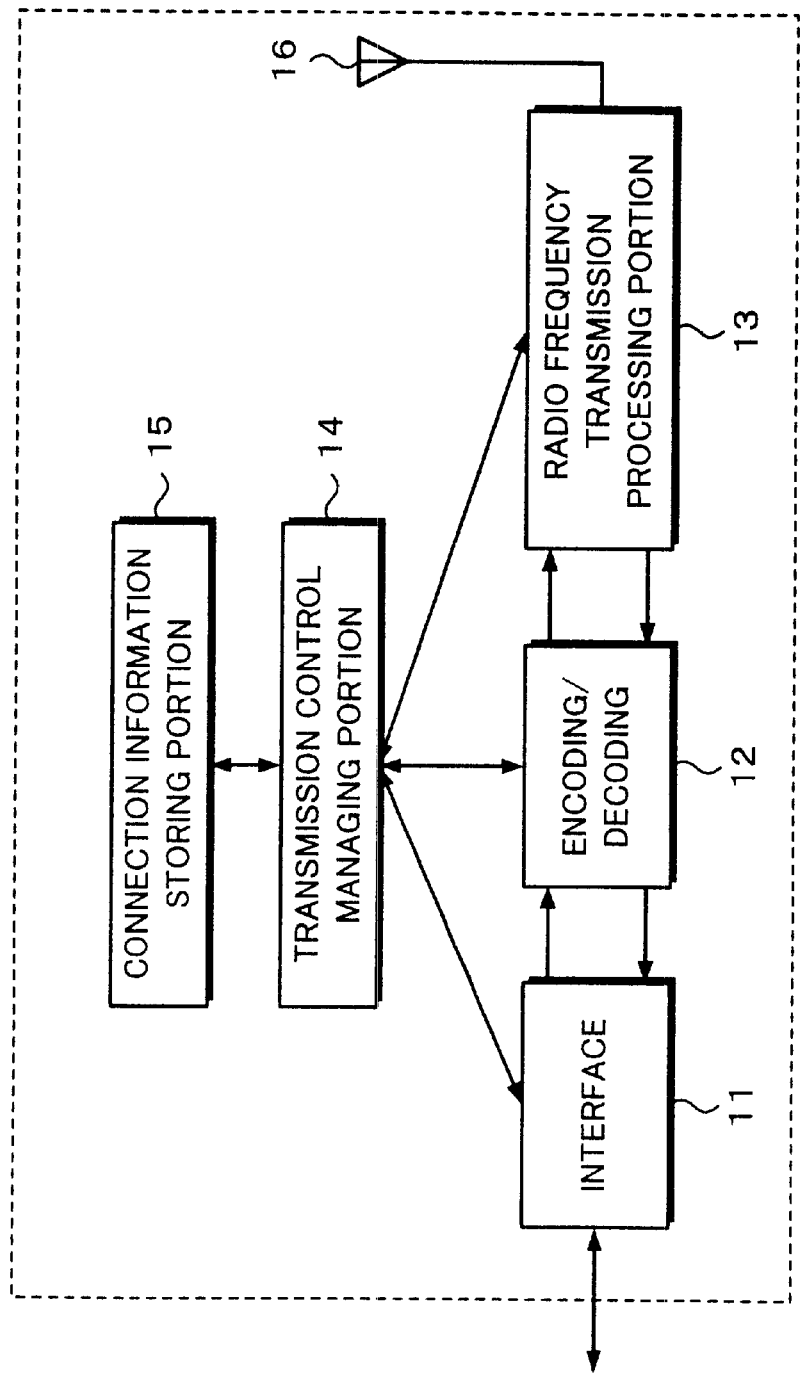
FIG. 12 is a block diagram showing an example of a wireless node of the wireless network system according to the present invention.

Next, the structure of each of the wireless nodes WN1, WN2, . . . and WNB will be described. FIG. 12 shows the structure of each of the wireless nodes WN1, WN2, . . . and WNB. The structure of each of the wireless nodes WNB as the controlling station is the same as the structure of the WN1, WN2, . . . as the communicating stations.

As shown in FIG. 12, each of the wireless nodes WN1, WN2, . . . and WNB has an IEEE 1394 digital interface 11. The IEEE 1394 digital interface 11 supports both chronologically continuous data (isochronous data) (such as digital audio data and digital video data) and asynchronous data (such as commands).

Each of the wireless nodes WN1, WN2, . . . , and WNB has an encoding/decoding portion 12, a radio frequency transmission processing portion 13, a transmission control managing portion 14, and a connection information storing portion 15.

The encoding/decoding portion 12 performs an encoding process for transmission data and a decoding process for reception data. When a data stream is transmitted, the encoding/decoding portion 12 performs an error correction encoding process for the data stream with a block code. In addition, the encoding/decoding portion 12 performs an error correcting process for reception data.

The radio frequency transmission processing portion 13 performs a modulating process for a transmission signal, converts the resultant signal into a signal of a predetermined frequency, amplifies the power of the resultant signal, extracts a signal of a particular frequency from the reception signal, converts the resultant signal into a signal of an intermediate frequency, and performs a demodulating process for the resultant signal. A variety of modulating methods have been proposed. Examples of the modulating methods are QPSK and multi-value QAM modulating method. Alternatively, the resultant data may be secondarily modulated by spectrum dispersing method or OFDM (Orthogonal Frequency Division Multiplexing) method.

The transmission control managing portion 14 manages data transmission. In other words, as described above, in this system, data is transmitted as frames. Data streams such as digital video data are transmitted with time slots. When asynchronous data is transmitted, an acknowledgment signal is sent back. When the acknowledgment signal is not sent back, a re-transmitting operation is performed. The transmission control managing portion 14 performs such a data transmitting process.

The connection information storing portion 15 stores network connection information that represents what data streams use what time slots. The connection information is transmitted and received as management area information as described above.

The wireless node WNB as the controlling station transmits management information in the control area MA at the beginning of each frame. To transmit the management information, the transmission control managing portion 14 outputs the management information to the encoding/decoding portion 12. In the time period of the control area MA at the beginning of the frame, an output signal of the encoding/decoding portion 12 is supplied to the radio frequency transmission processing portion 13. The radio frequency transmission processing portion 13 modulates the signal in a predetermined modulating method, converts the resultant signal into a signal of a predetermined transmission frequency, and amplifies the resultant signal in a desired power level. An output signal of the radio frequency transmission processing portion 13 is transmitted from an antenna 16.

When a data stream is transmitted, the data stream is supplied to the encoding/decoding portion 12 through the digital interface 11. The encoding/decoding portion 12 adds an error correction code as a block code to the data stream. Under the control of the transmission control managing portion 14, the data stream is allocated to predetermined time slots. In the time period of the allocated time slot, an output signal of the encoding/decoding portion 12 is supplied to the radio frequency transmission processing portion 13. The radio frequency transmission processing portion 13 modulates the signal in a predetermined modulating method, converts the signal into a signal of a predetermined transmission frequency, amplifies the resultant signal in a desired power level, and transmits the resultant signal from the antenna 16.

When asynchronous data is transmitted, the asynchronous data is supplied to the encoding/decoding portion 12 through the digital interface 11. The encoding/decoding portion 12 arranges the asynchronous data into a predetermined data sequence. Since a re-transmitting operation is performed for the asynchronous data, an error correction code encoding process is not performed for the asynchronous data. Under the control of the transmission control managing portion 14, the transmission timing of the data is designated. In the time period of the asynchronous transmission area ASYNCA at the end of the frame, an output signal of the encoding/decoding portion 12 is supplied to the radio frequency transmission processing portion 13. The radio frequency transmission processing portion 13 modulates the signal in a predetermined modulating method, converts the resultant signal into a signal of a predetermined transmission frequency, amplifies the resultant signal in a desired power level, and transmits the resultant signal from the antenna 16.

When data is received, a signal that is received from the antenna 16 is supplied to the radio frequency transmission processing portion 13. The radio frequency processing portion 13 converts the reception signal into a signal of an intermediate frequency, and demodulates the resultant signal into a base band signal.

When information in the control area MA is received, in the time period of the control area MA, under the control of the transmission control managing portion 14, an output signal of the radio frequency transmission processing portion 13 is supplied to the encoding/decoding portion 12. The encoding/decoding portion 12 decodes the information in the control area MA. The information in the control area MA is supplied to the transmission control managing portion 14. When the information in the control area MA contains management area information for managing the network, the management area information is supplied to the transmission control managing portion 14.

When a data stream is received, under the control of the transmission control managing portion 14, in the time period of a predetermined time slot in the stream packet transmission area, an output signal of the radio frequency transmission processing portion 13 is supplied to the encoding/decoding portion 12. The encoding/decoding portion 12 performs an error correcting process for the data stream transmitted with the predetermined time slots. An output signal of the encoding/decoding portion 12 is supplied to a predetermined unit through the digital interface 11.

When asynchronous data is received, in the time period of the asynchronous transmission area ASYNCA, an output signal of the radio frequency transmission processing portion 13 is supplied to the encoding/decoding portion 12. When the asynchronous data is received, under the control of the transmission control managing portion 14, a data re-transmitting operation is performed. In other words, when asynchronous data is received by a designated unit, it is determined whether or not the asynchronous data has been securely received by the designated unit. When the asynchronous data has been securely received by the designated unit, an acknowledgment signal is transmitted to the transmitting side. When the asynchronous data has not been securely received by the designated unit, a data re-transmission request is transmitted to the transmitting side. After the asynchronous data has been securely received, the asynchronous data is output to a relevant unit through the digital interface 11. When the asynchronous data contains management area information for managing the network, the management area information is transmitted to the transmission control managing portion 14.

In the system according to the present invention, a data stream is transmitted with slots of a frame. In contrast, asynchronous data is transmitted at the end of the frame. An error correction code is added to the stream data to correct an error thereof. A re-transmitting operation is performed for the asynchronous data. The asynchronous data area is dynamically allocated corresponding to uses of slots so as to effectively transmit data streams and asynchronous data with a frame. When a slot is unallocated, the position thereof is changed. Thus, the asynchronous transmission area is widened. The size of one frame, the size of one slot, and the number of allocated slots are properly designated corresponding to transmission conditions. In the above-described embodiment, the stream transmission area is followed by the asynchronous transmission area. However, the relation between the stream transmission area and the asynchronous transmission area is not limited to the above-described example. In other words, the stream transmission area may be preceded by the asynchronous transmission area.

The present invention is a wireless transmitting method, comprising the steps of forming a frame having a predetermined time period, placing a stream transmission period and an asynchronous transmission period in the frame, the stream transmission period having a predetermined number of time slots for transmitting data, allocating isochronous data to the time slots, transmitting the isochronous data in the stream transmission period, and transmitting asynchronous data in the asynchronous transmission period. In addition, the stream transmission period and the asynchronous transmission period are adaptively varied. Thus, two types of data transmission of data streams and asynchronous data can be effectively performed.

In addition, the present invention is a wireless transmitting method, comprising the steps of forming a frame having a predetermined time period, placing a stream transmission period and an asynchronous transmission period in the frame, the stream transmission period having a predetermined number of time slots for transmitting data, allocating isochronous data to the time slots, transmitting the isochronous data in the stream transmission period, transmitting asynchronous data in the asynchronous transmission period, and changing the allocation of the time slots and widening the asynchronous transmission period of the frame so as to gather the asynchronous transmission period when a time slot is unallocated. Thus, two types of data transmission of data streams and asynchronous data can be effectively performed.

Moreover, the present invention is a wireless transmitting method, comprising the steps of forming a frame having a predetermined time period, placing a stream transmission period and an asynchronous transmission period in the frame, the stream transmission period having a predetermined number of time slots for transmitting data, allocating isochronous data to the time slots, transmitting the isochronous data in the stream transmission period, transmitting asynchronous data in the asynchronous transmission period, searching a data stream having time slots that are unallocated, and placing the time slots of the searched data stream to the positions of the unallocated time slots so as to gather and widen the asynchronous transmission period. Thus, continuity of time slots for a data stream can be maintained.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A wireless transmitting method, comprising the steps of:

forming a frame having a predetermined time period;

placing a stream transmission period and an asynchronous transmission period in the frame, wherein the stream transmission period includes a predetermined number of time slots for transmitting data;

allocating isochronous data to the time slots;

transmitting the isochronous data in the stream transmission period; and transmitting asynchronous data in the asynchronous transmission period, wherein the stream transmission period and the asynchronous transmission period are adaptively varied in length so that when there is no isochronous data to be transmitted, the asynchronous transmission period is expanded to occupy the entire stream transmission period resulting in only the asynchronous data being transmitted in the frame.

2. The wireless transmission method as set forth in claim 1, wherein the time slots are allocated with information in a control area of the frame.

3. A wireless transmitting method, comprising the steps of:

forming a frame having a predetermined time period;

placing a stream transmission period and an asynchronous transmission period in the frame, wherein the stream transmission period includes a predetermined number of time slots for transmitting data;

allocating isochronous data to the time slots;

transmitting the isochronous data in the stream transmission period;

transmitting asynchronous data in the asynchronous transmission period, wherein the stream transmission period and the asynchronous transmission period are adaptively varied in length so that when there is no isochronous data to be transmitted, the asynchronous transmission period is expanded to occupy the entire stream transmission period resulting in only the asynchronous data being transmitted in the frame; and changing an allocation of the time slots of the stream transmission period for widening the asynchronous transmission period of the frame when a time slot is unallocated.

4. A wireless transmitting method, comprising the steps of:

forming a frame having a predetermined time period;

placing a stream transmission period and an asynchronous transmission period in the frame, wherein the stream transmission period includes a predetermined number of time slots for transmitting data;

allocating isochronous data to the time slots;

transmitting the isochronous data in the stream transmission period;

transmitting asynchronous data in the synchronous transmission period, wherein the stream transmission period and the asynchronous transmission period are adaptively varied in length so that when there is no isochronous data to be transmitted, the asynchronous transmission period is expanded to occupy the entire stream transmission period resulting in only the asynchronous data being transmitted in the frame;

searching a data stream having unallocated time slots for substitute time slots; and placing the substitute time slots of the searched data stream in positions of the unallocated time slots so as to widen the asynchronous transmission period.

5. A base station for use in a wireless system, comprising:

means for forming a frame having a predetermined time period;

means for placing a stream transmission period and an asynchronous transmission period in the frame, wherein the stream transmission period includes a predetermined number of time slots for transmitting data;

means for allocating isochronous data to the time slots;

means for transmitting the isochronous data in the stream transmission period; and means for transmitting asynchronous data in the asynchronous transmission period, wherein the stream transmission period and the asynchronous transmission period are adaptively varied in length so that when there is no isochronous data to be transmitted, the asynchronous transmission period is expanded to occupy the entire stream transmission period resulting in only the asynchronous data being transmitted in the frame.

* * * * *